United States Patent [19]

Albert et al.

[11] Patent Number: 5,282,894
[45] Date of Patent: Feb. 1, 1994

[54] USE OF A LIQUID CONTAINING IR DYES AS PRINTING INK

[75] Inventors: Bernhard Albert, Maxdorf; Friedrich Closs, Ludwigshafen; Juergen Kipper, Karlsruhe; Walter Kurtz, Bad Durkheim; Karin H. Beck, Ludwigshafen; Rudolf Griebel, Siegburg, all of Fed. Rep. of Germany

[73] Assignee: BASF Aktiengesellschaft, Ludwigshafen, Fed. Rep. of Germany

[21] Appl. No.: 8,590

[22] Filed: Jan. 25, 1993

[30] Foreign Application Priority Data

Jan. 25, 1992 [DE] Fed. Rep. of Germany ....... 4202038

[51] Int. Cl.⁵ ............................................. C09D 11/00
[52] U.S. Cl. .............................. 106/22 D; 106/22 R; 106/22 H
[58] Field of Search .................. 106/22 D; 22 R, 22 H

[56] References Cited

U.S. PATENT DOCUMENTS

| 3,023,186 | 2/1962 | Gelger | 524/88 |
| 3,484,467 | 12/1969 | Susi et al. | 260/440 |
| 4,606,859 | 8/1986 | Duggan et al. | 540/122 |
| 4,806,664 | 2/1989 | Schrott et al. | 556/136 |
| 4,990,649 | 2/1991 | Schrott et al. | 560/25 |
| 5,160,171 | 11/1992 | Gregory et al. | 283/91 |

FOREIGN PATENT DOCUMENTS

| 0134518 | 3/1985 | European Pat. Off. . |
| 0155780 | 8/1985 | European Pat. Off. . |
| 0192215 | 8/1986 | European Pat. Off. . |
| 0310080 | 4/1989 | European Pat. Off. . |
| 0464543 | 1/1992 | European Pat. Off. . |
| 1073739 | 7/1960 | Fed. Rep. of Germany . |
| 3826734 | 2/1990 | Fed. Rep. of Germany . |
| 4022822 | 10/1991 | Fed. Rep. of Germany . |
| 2168372 | 6/1986 | United Kingdom . |
| 2200650 | 8/1988 | United Kingdom . |

OTHER PUBLICATIONS

Patent Abstracts of Japan, vol. 015, No. 248 (C–0843), Jun. 25, 1991 and JP-A-30 79 683 (Toyo Ink) Apr. 4, 1991.
Patent Abstracts of Japan, vol. 015, No. 450 (C–0885), Nov. 15, 1991 and JP-A-31 92 171 (Toyo Ink) Aug. 22, 1991.
Journal of American Chemical Society, vol. 106, 1984, pp. 7404–7410, A. L. Wheeler, et al.
Chemical Abstracts, AN-90-346142, & JP-A-22-51-578, Oct. 9, 1990.
The Phthalocyanines, vol. 2, 1988, Frank H. Moser, et al.
The Printing Ink Manual, 4th Edition, 1988, Edited by: R. H. Leach, et al.

Primary Examiner—Helene Klemanski
Attorney, Agent, or Firm—Oblon, Spivak, McClelland, Maier & Neustadt

[57] ABSTRACT

A liquid useful as printing ink contains one or more dyes with their absorption maximum within the range from 700 to 1200 nm selected from the phthalocyanines, the naphthalocyanines, the nickel-dithiolene complexes, the aminium compounds of aromatic amines, the methine dyes or the azulenesquaric acid dyes, as well as solvent and binder.

10 Claims, No Drawings

USE OF A LIQUID CONTAINING IR DYES AS PRINTING INK

The present invention relates to the use of a liquid comprising one or more dyes with their absorption maximum within the range from 700 to 1200 nm selected from the metal-free phthalocyanines, the phthalocyanines with two times lithium, magnesium, zinc, copper, nickel, VO, TiO or AlCl as central atom, the metal-free naphthalocyanines, the naphthalocyanines with two times lithium, magnesium, zinc, copper, nickel, VO, TiO or AlCl as central atom, the nickel-dithiolene complexes, the aminium compounds of aromatic amines, the methine dyes or the azulenesquaric acid dyes, solvents and binders, as printing ink.

Modern communications technology is promoting the importance of fast error-free data entry. Of particular importance is the automatic, digital reading of information in printed, digital or analog form. An example are printed bar codes that are scannable and readable using suitable light sources and detectors.

For instance, machine readable bar codes are printed using commercial printing inks. By means of additives such as carbon black, specific pigments or metal powders, it is also possible to read printed, visible bar codes using light of a wavelength above the visible region.

For example, DE-A-3 826 734 describes colorants for the ink jet process that are readable not only in the visible but also in the infrared region.

Moreover, JP-A-251 578/1991 discloses metal complexes with which it is possible to prepare oil-based inks that absorb in the near IR region.

However, virtually all the prints prepared with such colorants are strongly absorbing in the visible region.

Furthermore, DE-C-4 022 822 discloses the use of silicon naphthalocyanine in printing inks.

It is an object of the present invention to provide suitable liquids that are advantageous for preparing prints by intaglio, letterpress or flexographic printing. The prints produced should be sufficiently absorbing in the near infrared for reading by suitable bar code readers and show little if any absorption in the visible region.

We have found that this object is achieved by using the liquids defined at the beginning as printing inks.

Suitable phthalocyanines conform for example to the formula Ia

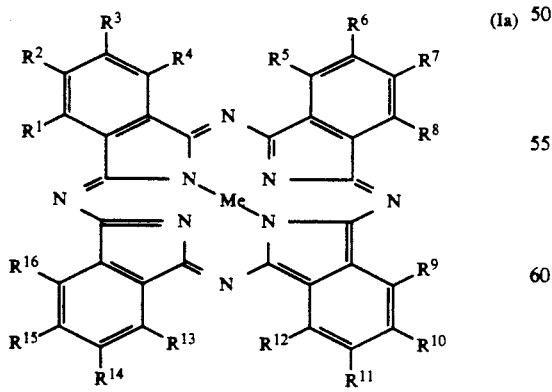

where
Me is two times hydrogen, two times lithium, magnesium, zinc, copper, nickel, VO, TiO or AlCl, at least 4 of the radicals $R^1$ to $R^{16}$ are each independently of the others a radical of the formula $W-X^1$, where W is a chemical bond, sulfur, imino, $C_1$-$C_4$-alkylimino or phenylimino and $X^1$ is $C_1$-$C_{20}$-alkyl, which may be interrupted by from 1 to 4 oxygen atoms in ether function and may be phenyl-substituted, or is substituted or unsubstituted phenyl, and any remaining radicals $R^1$ to $R^{16}$ are each hydrogen, halogen, hydroxysulfonyl or $C_1$-$C_4$-dialkylsulfamoyl.

Suitable phthalocyanines also conform for example to the formula Ib

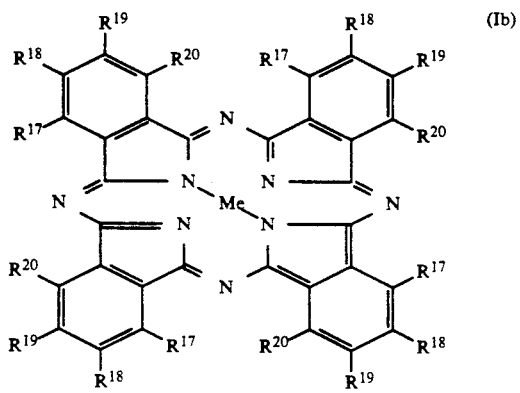

where
$R^{17}$ and $R^{18}$ or $R^{18}$ and $R^{19}$ or $R^{19}$ and $R^{20}$ together are in each case a radical of the formula $X^2$—$C_2H_4$—$X^3$, wherein one of the two radicals $X^2$ and $X^3$ is oxygen and the other is imino or $C_1$-$C_4$-alkylimino, $R^{19}$ and $R^{20}$ or $R^{17}$ and $R^{20}$ or $R^{17}$ and $R^{18}$ are each independently of the other hydrogen or halogen, and Me is as defined above.

Suitable naphthalocyanines conform for example to the formula II

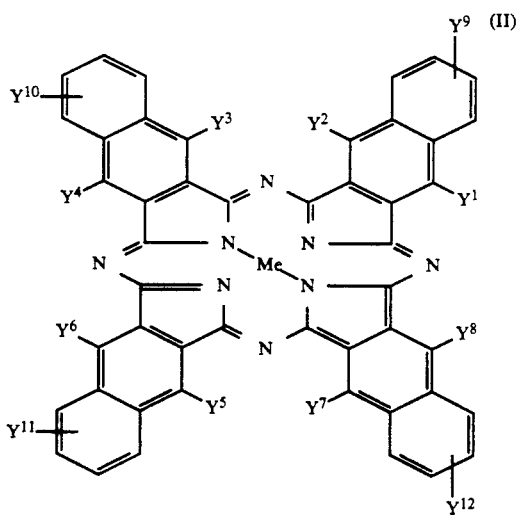

where $Y^1$, $Y^2$, $Y^3$, $Y^4$, $Y^5$, $Y^6$, $Y^7$ and $Y^8$ are each independently of the others hydrogen, hydroxyl $C_1$-$C_{20}$-alkyl or $C_1$-$C_{20}$-alkoxy, wherein the alkyl groups may each be interrupted by from 1 to 4 oxygen atoms in ether function and may be phenylsubstituted, and $Y^9$, $Y^{10}$, $Y^{11}$ and $Y^{12}$ are each independently of the others hydrogen, $C_1-C_{20}$-alkyl or $C_1-C_{20}$-alkoxy, wherein the alkyl groups may each be interrupted by from 1 to 4 oxygen atoms in ether function, halogen, hydroxysulfonyl or $C_1-C_4$-dialkylsulfamoyl, and Me is as defined above.

Of particular interest are those naphthalocyanines of the formula II in which at least one of the radicals $Y^1$ to $Y^8$ is not hydrogen.

Suitable nickel-dithiolene complexes conform for example to the formula III

  (III)

where $L^1$, $L^2$, $L^3$ and $L^4$ are each independently of the others $C_1-C_{20}$-alkyl, which may be interrupted by from 1 to 4 oxygen atoms in ether function, phenyl, $C_1-C_{20}$-alkylphenyl, $C_1-C_{20}$-alkoxyphenyl, wherein the alkyl groups may each be interrupted by from 1 to 4 oxygen atoms in ether function, or $L^1$ and $L^2$ and/or $L^3$ and $L^4$ are in each case together the radical of the formula

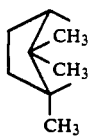

Suitable aminium compounds conform for example to the formula IV

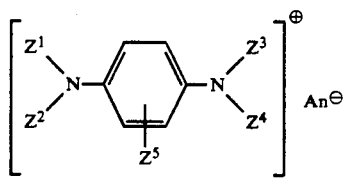  (IV)

where $Z^1$, $Z^2$, $Z^3$ and $Z^4$ are each independently of the others $C_1-C_{20}$-alkyl, which may be interrupted by from 1 to 4 oxygen atoms in ether function, $C_1-C_{20}$-alkanoyl or a radical of the formula

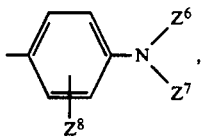

where $Z^6$ is hydrogen, $C_1-C_{20}$-alkyl, which may be interrupted by from 1 to 4 oxygen atoms in ether function, or $C_1-C_{20}$-alkanoyl, $Z^7$ is hydrogen or $C_1-C_{20}$-alkyl, which may be interrupted by from 1 to 4 oxygen atoms in ether function, and $Z^8$ is hydrogen, $C_1-C_{20}$-alkyl, which may be interrupted by from 1 to 4 oxygen atoms in ether function, or halogen, and $An^\ominus$ is one equivalent of an anion.

Suitable methine dyes conform for example to the formula V

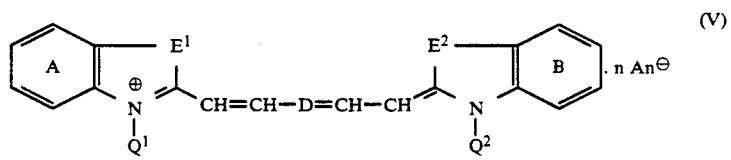  (V)

where the rings A and B may each be benzofused independently of the other and may be substituted, $E^1$ and $E^2$ are each independently of the other oxygen, sulfur, imino or a radical of the formula —$C(CH_3)_2$— or —CH=CH—, D is a radical of the formula

—$CE^3$=, —CH=$CE^3$—CH=,

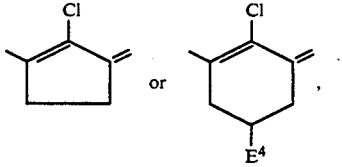

where $E^3$ is hydrogen, $C_1-C_6$-alkyl, chlorine or bromine and $E^4$ is hydrogen or $C_1-C_6$-alkyl, $Q^1$ and $Q^2$ are each independently of the other phenyl, $C_5-C_7$-cycloalkyl, $C_1-C_{12}$-alkyl, which may be interrupted by from 1 to 3 oxygen atoms in ether function and may be substituted by hydroxyl, chlorine, bromine, carboxyl, $C_1-C_4$-alkoxycarbonyl, acryloyloxy, methacryloyloxy, hydroxysulfonyl, $C_1-C_7$-alkanoylamino, $C_1-C_6$-alkylcarbamoyl, $C_1-C_6$-alkylcarbamoyloxy or a radical of the formula $G^\oplus(K)_3$, where G is nitrogen or phosphorus and K is phenyl, $C_5-C_7$-cycloalkyl or $C_1-C_{12}$-alkyl, $An^\ominus$ is one equivalent of an anion, and n is 1, 2 or 3.

Suitable azulenesquaric acid dyes conform for example to the formula VI

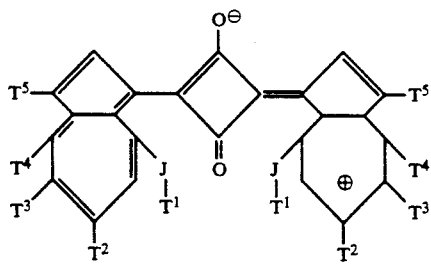

(VI)

where J is $C_1$–$C_{12}$-alkylene, $T^1$ is hydrogen, halogen, amino, hydroxyl, $C_1$–$C_{12}$-alkoxy, phenyl, substituted phenyl, carboxyl, $C_1$–$C_{12}$-alkoxycarbonyl, cyano or a radical of the formula —$NT^7$—CO—$T^6$, —CO—$NT^6T^7$ or O—CO—$NT^6T^7$, where $T^6$ and $T^7$ are each independently of the other hydrogen, $C_1$–$C_{12}$-alkyl, $C_5$–$C_7$-cycloalkyl, phenyl, 2,2,6,6-tetramethylpiperidin-4-yl or cyclohexylaminocarbonyl, and $T^2$, $T^3$, $T^4$ and $T^5$ are each independently of the others hydrogen or $C_1$–$C_{12}$-alkyl, which may be substituted by halogen, amino, $C_1$–$C_{12}$-alkoxy, phenyl, substituted phenyl, carboxyl, $C_1$–$C_{12}$-alkoxycarbonyl or cyano, with the proviso that the ring positions of the substituents J-$T^1$ and $T^4$ within an azulene ring may also be interchanged in either or both of the azulene rings when $T^5$ is hydrogen.

Any alkyl, alkylene or alkenyl appearing in the abovementioned formulae can be straight-chain or branched.

In the formula Ia, II, III or IV, suitable $C_1$–$C_{20}$-alkyl with optional interruption by from 1 to 4 oxygen atoms in ether function is for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl (the above designations isooctyl, isononyl, isodecyl and isotridecyl are trivial names derived from the oxo process alcohols - cf. Ullmanns Encyklopädie der technischen Chemie, 4th edition, volume 7, pages 215 to 217, and volume 11, pages 435 and 436), tetradecyl, pentadecyl, hexadecyl, heptadecyl, octadecyl, nonadecyl, eicosyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl or 3,6,9,12-tetraoxatetradecyl.

In the formula I or II suitable $C_1$–$C_{20}$-alkyl substituted by phenyl is for example benzyl or 1- or 2-phenylethyl.

In the formula II, III or IV suitable $C_1$–$C_{20}$-alkoxy with optional interruption by from 1 to 4 oxygen atoms in ether function is for example methoxy, ethoxy, propoxy, isopropoxy, butoxy, isobutoxy, pentyloxy, hexyloxy, heptyloxy, octyloxy, 2-ethylhexyloxy, isooctyloxy, nonyloxy, isononyloxy, decyloxy, isodecyloxy, undecyloxy, dodecyloxy, tridecyloxy, isotridecyloxy, tetradecyloxy, pentadecyloxy, hexadecyloxy, heptadecyloxy, octadecyloxy, nonadecyloxy, eicosyloxy, 2-methoxyethoxy, 2-ethoxyethoxy, 2-propoxyethoxy, 2-isopropoxyethoxy, 2-butoxyethoxy, 2- or 3-methoxypropoxy, 2- or 3-ethoxypropoxy, 2- or 3-propoxypropoxy, 2- or 3-butoxypropoxy, 2- or 3-methoxybutoxy, 2- or 4-ethoxybutoxy, 2- or 4-propoxybutoxy, 2- or 4-butoxybutoxy, 3,6-dioxaheptyloxy, 3,6-dioxaoctyloxy, 4,8-dioxanonyloxy, 3,7-dioxaoctyloxy, 3,7-dioxanonyloxy, 4,7-dioxaoctyloxy, 4,7-dioxanonyloxy, 4,8-dioxadecyloxy, 3,6,8-trioxadecyloxy, 3,6,9-trioxaundecyloxy, 3,6,9,12-tetraoxatridecyloxy or 3,6,9,12-tetraoxatetradecyloxy.

In the formula II suitable $C_1$–$C_{20}$-alkoxy substituted by phenyl is for example benzyloxy or 1- or 2-phenylethoxy.

In the formula Ia, III or VI suitable substituted phenyl is for example phenyl substituted by $C_1$–$C_6$-alkyl, $C_1$–$C_6$-alkoxy, hydroxyl or halogen. In general there may be from 1 to 3 substituents.

Halogen in the formula Ib, II, IV or VI is for example fluorine, chlorine or bromine.

W in the formula Ia and $X^2$ or $X^3$ in the formula Ib are each for example methylimino, ethylimino, propylimino, isopropylimino or butylimino.

$R^1$ to $R^{16}$ in the formula Ia and $Y^9$ to $Y^{12}$ in the formula II are each for example dimethylsulfamoyl, diethylsulfamoyl, dipropylsulfamoyl, dibutylsulfamoyl or N-methyl-N-ethylsulfamoyl.

$Z^6$ in the formula IV is for example formyl, acetyl, propionyl, butyryl, isobutyryl, pentanoyl, hexanoyl, heptanoyl, octanoyl or 2-ethylhexanoyl.

Substituted rings A and/or B in the formula V may have as substituents for example $C_1$–$C_6$-alkyl, phenyl-$C_1$–$C_6$-alkoxy, phenoxy, halogen, hydroxyl, amino, mono- or di($C_1$–$C_6$-alkyl)amino or cyano. If the rings are substituted, there will in general be from 1 to 3 substituents.

$E^3$, $E^4$, $Q^1$ and $Q^2$ in the formula V are each for example, methyl, ethyl, propyl, isopropyl, butyl, isobutyl, sec-butyl, pentyl, isopentyl, neopentyl, tert-pentyl or hexyl.

$Q^1$ and $Q^2$ may each also be for example hexyl, 2-methylpentyl, heptyl, octyl, 2-ethylhexyl, isooctyl, nonyl, isononyl, decyl, isodecyl, undecyl, dodecyl, cyclopentyl, cyclohexyl, 2-methoxyethyl, 2-ethoxyethyl, 2- or 3-methoxypropyl, 2- or 3-ethoxypropyl, 2-hydroxyethyl, 2- or 3-hydroxypropyl, 2-chloroethyl, 2-bromoethyl, 2- or 3-chloropropyl, 2- or 3-bromopropyl, 2-carboxyethyl, 2- or 3-carboxypropyl, 2-methoxycarbonylethyl, 2-ethoxycarbonylethyl, 2- or 3-methoxycarbonylpropyl, 2- or 3-ethoxycarbonylpropyl, 2-acryloyloxyethyl, 2- or 3-acryloyloxypropyl, 2-methacryloyloxyethyl, 2- or 3-methacryloyloxypropyl, 2-hydroxysulfonylethyl, 2- or 3-hydroxysulfonylpropyl, 2-acetylaminoethyl, 2- or 3-acetylaminopropyl, 2-methylcarbamoylethyl, 2-ethylcarbamoylethyl, 2- or 3-methylcarbamoylpropyl, 2- or 3-ethylcarbamoylpropyl, 2-methylcarbamoyloxyethyl, 2-ethylcarbamoyloxyethyl, 2- or 3-methylcarbamoyloxypropyl, 2- or 3-ethylcarbamoyloxypropyl, 2-(trimethylammonium)ethyl, 2-(triethylammonium)ethyl, 2- or 3-(trimethylammonium)propyl, 2- or 3-(triethylammonium)propyl, 2-(triphenylphosphonium)ethyl or 2- or 3-(triphenylphosphonium)propyl.

$An^\ominus$ in the formula IV or V is derived for example from anions of organic or inorganic acids. Particularly preferred examples are methanesulfonate, 4-methylbenzenesulfonate, acetate, trifluoroacetate, heptafluorobutyrate, chloride, bromide, iodide, perchlorate, tetrafluoroborate, nitrate, hexafluorophosphate and tetraphenylborate.

Other suitable inorganic anions are the anions of heteropoly acids, for example of phosphorus or of silicon. Examples are molybdatophosphoric acid, molybdatosilicic acid, vanadatophosphoric acid, vanadatosilicic acid, tungstophosphoric acid, tungstosilicic acid and mixed acids of this kind.

J in the formula VI is for example methylene, ethylene, 1,2- or 1,3-propylene, 1,2-, 1,3-, 2,3- or 1,4-butylene, pentamethylene, hexamethylene, heptamethylene, octamethylene, nonamethylene, decamethylene, undecamethylene or dodecamethylene.

$T^2$, $T^3$, $T^4$ and $T^5$ in the formula VI are each for example methyl, ethyl, propyl, isopropyl, butyl, isobutyl, sec-butyl, tert-butyl, pentyl, isopentyl, neopentyl, tert-pentyl, 2-methylbutyl, hexyl, 2-methylpentyl, heptyl, octyl, 2-ethylhexyl, isooctyl, nonyl, isononyl, decyl, undecyl, dodecyl, fluoromethyl, chloromethyl, difluoromethyl, trifluoromethyl, trichloromethyl, 2-fluoroethyl, 2-chloroethyl, 2-bromoethyl, 1,1,1-trifluoroethyl, heptafluoropropyl, 4-chlorobutyl, 5-fluoropentyl, 6-chlorohexyl, cyanomethyl, 2-cyanoethyl, 3-cyanopropyl, 2-cyanobutyl, 4-cyanobutyl, 5-cyanopentyl, 6-cyanohexyl, 2-aminoethyl, 2-aminopropyl, 3-aminopropyl, 2-aminobutyl, 4-aminobutyl, 5-aminopentyl, 6-aminohexyl, 2-hydroxyethyl, 2-hydroxypropyl, 3-hydroxypropyl, 2-hydroxybutyl, 4-hydroxybutyl, 5-hydroxypentyl, 6-hydroxyhexyl, 2-methoxyethyl, 2-ethoxyethyl, 2-propoxyethyl, 2-isopropoxyethyl, 2-butoxyethyl, 2-methoxypropyl, 2-ethoxypropyl, 3-ethoxypropyl, 4-ethoxybutyl, 4-isopropoxybutyl, 5-ethoxypentyl, 6-methoxyhexyl, benzyl, 1-phenylethyl, 2-phenylethyl, 4-chlorobenzyl, 4-methoxybenzyl, 2-(4-methylphenyl)ethyl, carboxymethyl, 2-carboxyethyl, 3-carboxypropyl, 4-carboxybutyl, 5-carboxypentyl, 6-carboxyhexyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonylpentyl, 5-ethoxycarbonylpentyl, 6-methoxycarbonylhexyl or 6-ethoxycarbonylhexyl.

$T^1$ in the formula I is for example methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, neopentyloxycarbonyl, tert-pentyloxycarbonyl, hexyloxycarbonyl, heptyloxycarbonyl, octyloxycarbonyl, isooctyloxycarbonyl, nonyloxycarbonyl, isononyloxycarbonyl, decyloxycarbonyl, isodecyloxycarbonyl, undecyloxycarbonyl, dodecyloxycarbonyl, methoxy, ethoxy, propoxy, isopropoxy, butoxy, isobutoxy, pentyloxy, hexyloxy, acetylamino, carbamoyl, mono- or dimethylcarbamoyl, mono- or diethylcarbamoyl, monocyclohexylcarbonyl, phenylcarbamoyl, dimethylcarbamoyloxy or diethylcarbamoyloxy.

Preference is given to the use of liquids as printing ink that contain one or more dyes of the class of the naphthalocyanines or nickel-dithiolene complexes.

Particular preference is given to the use of liquids as printing ink that contain one or more naphthalocyanines of the formula IIa

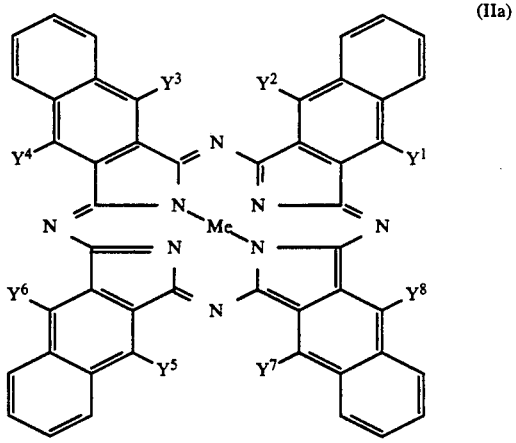

where $Y^1$, $Y^2$, $Y^3$, $Y^4$, $Y^5$, $Y^6$, $Y^7$ and $Y^8$ are each independently of the others hydrogen, hydroxyl, $C_1$–$C_4$-alkyl or $C_1$–$C_{20}$-alkoxy, and Me is two times hydrogen, two times lithium, magnesium, zinc, copper, nickel, VO or AlCl.

Very particular preference is given to the use of liquids as printing ink that contain one or more naphthalocyanines of the formula IIa where $Y^1$, $Y^2$, $Y^3$, $Y^4$, $Y^5$, $Y^6$, $Y^7$ and $Y^8$ are each independently of the others hydroxyl or $C_1$–$C_{20}$-alkoxy, in particular $C_1$–$C_{10}$-alkoxy. The alkoxy radicals can be identical or different.

Very particular preference is further given to the use of liquids as printing ink that contain one or more naphthalocyanines of the formula IIa where Me is two times hydrogen.

Particular preference is further given to the use of liquids as printing ink that contain one or more nickel-dithiolene complexes of the formula III where $L^1$, $L^2$, $L^3$ and $L^4$ are each independently of the others phenyl, $C_1$–$C_{20}$-alkylphenyl, $C_1$–$C_{20}$-alkoxyphenyl or hydroxyl- or $C_1$–$C_{20}$-alkyl-substituted phenyl or $L^1$ and $L^2$ on the one hand and $L^3$ and $L^4$ on the other together are in each case the radical of the formula

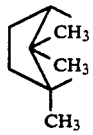

Very particular preference is further given to the use of liquids as printing ink that contain one or more nickel-dithiolene complexes of the formula III where $L^1$ and $L^4$ are each phenyl and $L^2$ and $L^4$ are each a radical of the formula 4—$C_2H_5$—$C(CH_3)_2$—$C_6H_4$.

The phthalocyanines of the formula Ia are known per se and described for example in DE-B-1 073 739 or EP-A-155 780 or obtainable by methods known per se for the preparation of phthalocyanines or naphthalocyanines, described for example in F. H. Moser, A. L. Thomas, The Phthalocyanines, CRC Press, Boca Rota, Fla., 1983, or J. Amer. Chem. Soc. 106 (1984), 7404–7410.

The phthalocyanines of the formula Ib are likewise known per se and described for example in EP-A-155

780 or obtainable by the methods of the abovementioned prior art (Moser, J.Amer.Chem.Soc.).

The naphthalocyanines of the formula II are likewise known per se and described for example in GB-A-2 168 372 or GB-A-2 200 650 or obtainable by the methods of the abovementioned prior art (Moser, J. Amer. Chem. Soc.).

The nickel-dithiolene complexes of the formula III are likewise known per se and described for example in EP-A-192 215.

The aminium compounds of the formula IV are likewise known per se and described for example in US-A-3 484 467 or obtainable by the methods described therein.

The methine dyes of the formula V are likewise known per se and described for example in the earlier patent application EP-A-464,543 or obtainable by the methods described therein.

The azulenesquaric acid dyes of the formula VI are likewise known per se and described for example in EP-A-310 080 or U.S. Pat. No. 4 990 649 or obtainable by the methods described therein.

Suitable solvents for the liquids to be used according to the invention are for example water, alcohols, such as methanol, ethanol, propanol, isopropanol, butanol, isobutanol, sec-butanol, pentanol, isopentanol, neopentanol or hexanol, glycols, such as 1,2-ethylene glycol, 1,2- or 1,3-propylene glycol, 1,2-, 2,3- or 1,4-butylene glycol, di- or triethylene glycol or di- or tripropylene glycol, ethers, such as methyl tert-butyl ether, 1,2-ethylene glycol monomethyl or dimethyl ether, 1,2-ethylene glycol monoethyl or diethyl ether, 3-methoxypropanol, 3-isopropoxypropanol, tetrahydrofuran or dioxane, ketones, such as acetone, methyl ethyl ketone or diacetone alcohol, esters, such as methyl acetate, ethyl acetate, propyl acetate or butyl acetate, aliphatic or aromatic hydrocarbons such as pentane, hexane, heptane, octane, isooctane, petroleum ether, toluene, xylene, ethylbenzene, tetralin, decalin, dimethylnaphthalene, white spirit, mineral oil or kerosene, drying vegetable oils or compatible mixtures of these solvents.

Further suitable solvents are listed for example in R. H. Leach (ed.), The Printing Ink Manual, 4th edition, 1988, Van Nostrand Reinhold, London.

Suitable binders for the liquids to be used according to the invention are for example natural resins, such as rosin, resinates, shellac, asphalts or gum arabic, or synthetic resins, such as phenolics, phenol-modified rosin, alkyds, polystyrene, polystyrene copolymers, terpene resins, silicone resins, urea-formaldehyde resins, melamine resins, polyamide resins, polyamide resins, polyacrylates, polymethacrylates, chlorinated rubber, vinyl ester resins, acrylic resins, epoxy resins, polyisocyanate resins, nitrocellulose, hydrocarbon resins and cellulose acetate.

Further suitable binders are described for example in The Printing Ink Manual (see above).

The liquids to be used according to the invention may contain further additives, for example plasticizers, waxes, siccatives, chelators, antioxidants, stabilizers, adhesion promoters or surfactants.

The liquids to be used according to the invention contain in general from 0.001 to 15% by weight, preferably from 0.01 to 5% by weight, each percentage being based on the weight of liquid, of dye.

The dyes are present therein in dissolved form or in solid form (in a finely divided state).

The liquids to be used according to the invention also contain in general from 10 to 60% by weight, preferably from 15 to 40% by weight, each percentage being based on the weight of liquid, of binder.

Preference is given to the use of a liquid as printing ink that contains toluene or mineral oil as solvent.

Preference is further given to the use of a liquid as printing ink that contains a binder based on polyacrylate or polymethacrylate.

The liquids to be used according to the invention are advantageously prepared in a conventional manner, for example by mixing the individual components. They have a low dye concentration. As mentioned earlier, the dye is present in the liquids in a dissolved or finely divided solid form. They are particularly suitable in intaglio, letterpress or flexographic printing. They are also advantageous for documents and securities.

The liquids to be used according to the invention are advantageously employed on substrates that have a high reflectance ($\geq 70\%$) in the IR region.

When additional colorants are to be employed, the time of application of the liquid to be used according to the invention is immaterial. The liquid to be used according to the invention can for example be applied first and then be overprinted with conventional printing inks. But it is also possible to reverse this sequence or, alternatively, to apply the liquid to be used according to the invention in a mixture with conventional printing inks. In every case the prints (e.g. bar codes) are readable with suitable light sources.

A particularly surprising aspect is that readily IR-readable prints are obtained even though the liquids to be employed according to the invention have only a low dye content.

Embodiments of the invention will now be more particularly described by way of example.

General procedure I

A 10% by weight solution of the binder in a solvent is prepared. 10 mg of dye are added to 10 ml of this solution at 20° C. with stirring until dissolved. The resulting solution is applied with a 36 μm wire-wound draw bar on the one hand to half tone paper and on the other to a polyester sheet and dried.

Then the films on the plastic are measured in transmitted light and those on the paper in reflected light, the absorption maximum being deemed to be located at the minimum reflectance wavelength.

DYE 1
Hexadecaphenylthio copper phthalocyanine

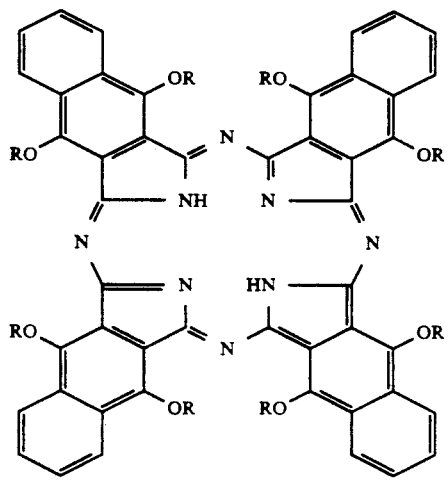

11

-continued
(R = (CH$_2$)$_4$—CH$_3$)

DYE 3
Tetradecaphenylthio copper phthalocyanine

DYE 4
Tetradecadodecylthio copper phthalocyanine

DYE 5

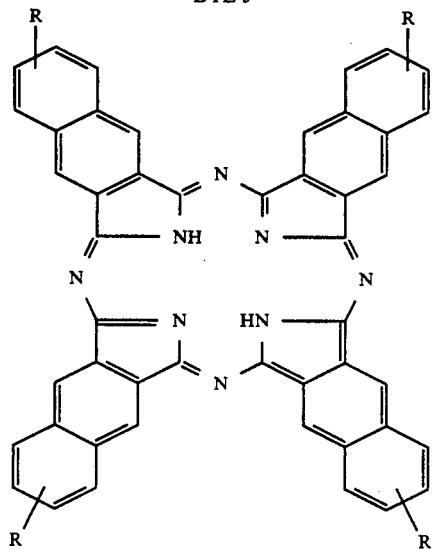

12

-continued
(R = t-C$_4$H$_9$)

DYE 6
Hexadeca(4-tert-butylphenylthio) copper phthalocyanine

DYES 7 TO 11

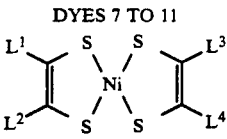

| Dye No. | L$^1$ | L$^2$ | L$^3$ | L$^4$ |
|---|---|---|---|---|
| 7 | 2,6-di-tert-butyl-4-methylphenol group (with (CH$_3$)$_3$C substituents and OH) | C$_6$H$_5$ | 2,6-di-tert-butyl-4-methylphenol group | C$_6$H$_5$ |
| 8 | 4-(2-methylbutan-2-yl)phenyl group (C(CH$_3$)$_2$C$_2$H$_5$) | C$_6$H$_5$ | 4-(2-methylbutan-2-yl)phenyl group | C$_6$H$_5$ |
| 9 | C$_6$H$_5$ | C$_6$H$_5$ | C$_6$H$_5$ | C$_6$H$_5$ |
| 10 | 4-dodecylphenyl group (C$_{12}$H$_{25}$) | C$_6$H$_5$ | 4-dodecylphenyl group (C$_{12}$H$_{25}$) | C$_6$H$_5$ |
| 11 | trimethylcyclohexyl group (CH$_3$, CH$_3$, CH$_3$) | | trimethylcyclohexyl group (CH$_3$, CH$_3$, CH$_3$) | |

DYES 12 TO 14

-continued

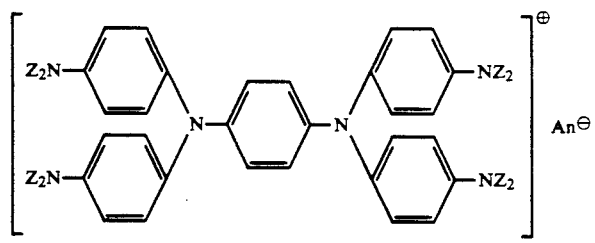

| Dye No. | Z | An⁻ |
|---|---|---|
| 12 | $C_4H_9$ | $NO_3^{\ominus}$ |
| 13 | $C_2H_5$ | $NO_3^{\ominus}$ |
| 14 | $C_4H_9$ | $BF_4^{\ominus}$ |

DYES 15 TO 19

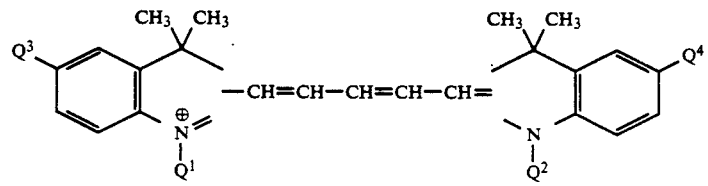

| Dye No. | $Q^1$ | $Q^2$ | $Q^3$ | $Q^4$ | An⁻ |
|---|---|---|---|---|---|
| 15 | $CH_3$ | $CH_3$ | Cl | Cl | $I^{\ominus}$ |
| 16 | $CH_3$ | $CH_3$ | H | H | $I^{\ominus}$ |
| 17 | $C_2H_4OCNHC(CH_3)_3$ (O=) | $C_2H_4OCNHC(CH_3)_3$ (O=) | H | H | $I^{\ominus}$ |
| 18 | $C_2H_4CNHC_6H_{13}$ (O=) | $C_2H_4CNHC_6H_{13}$ (O=) | H | H | $ClO_4^{\ominus}$ |
| 19 | $C_3H_6SO_3^{\ominus}$ | $C_3H_6SO_3H$ | H | H | Betain |

DYE 20

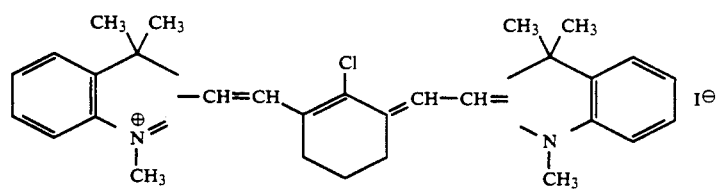

The binders used were as follows:
B 1 = phenol-modified rosin
B 2 = commercial hydrocarbon resin
B 3 = zinc-calcium salt of rosin
B 4 = low molecular weight polymethyl methacrylate
B 5 = styrene-acrylonitrile compolymer
B 6 = polystyrene
The solvent used was toluene.
The results obtained are listed below in Table 1.

TABLE 1

| Ex. No. | Dye No. | Binder | Absorption maximum [nm] | |
|---|---|---|---|---|
| | | | Paper | Plastic |
| 21 | 1 | B1 | 780 | 775 |
| 22 | 1 | B5 | 775 | 775 |
| 23 | 2 | B1 | 845 | 845 |
| 24 | 3 | B1 | 770 | 770 |
| 25 | 4 | B1 | 720 | 720 |
| 26 | 5 | B5 | 715 | 720 |
| 27 | 6 | B5 | 780 | 780 |
| 28 | 7 | B1 | 850 | |
| 29 | 8 | B4 | 865 | 875 |
| 30 | 8 | B5 | 860 | 890 |
| 31 | 8 | B2 | 880 | 885 |

TABLE 1-continued

| Ex. No. | Dye No. | Binder | Absorption maximum [nm] | |
|---|---|---|---|---|
| | | | Paper | Plastic |
| 32 | 9 | B1 | 910 | |
| 33 | 10 | B2 | 865 | |
| 34 | 10 | B1 | 870 | |
| 35 | 10 | B3 | 870 | |
| 36 | 10 | B6 | 815 | |
| 37 | 10 | B4 | 865 | |
| 38 | 10 | B5 | 860 | |
| 39 | 11 | B5 | 785 | 795 |
| 40 | 11 | B6 | 780 | |
| 41 | 12 | B5 | 950 | 1000 |
| 42 | 13 | B5 | 950 | 1000 |
| 43 | 14 | B5 | 950 | 990 |
| 44 | 15 | B1 | 770 | |
| 45 | 15 | B5 | 765 | 790 |
| 46 | 15 | B2 | 765 | |
| 47 | 15 | B3 | 760 | |
| 48 | 16 | B5 | 750 | 765 |
| 49 | 17 | B3 | 760 | |
| 50 | 17 | B5 | 760 | 755 |
| 51 | 17 | B2 | 755 | |
| 52 | 17 | B1 | 760 | |
| 53 | 18 | B5 | 755 | 760 |

TABLE 1-continued

| Ex. No. | Dye No. | Binder | Absorption maximum [nm] Paper | Absorption maximum [nm] Plastic |
|---|---|---|---|---|
| 54 | 19 | B5 | | 770 |
| 55 | 20 | B5 | 785 | 770 |

General procedure II 1 g of dye is combined with 45 g of binder B1 and 55 g of toluene to form a printing ink.

Uncoated, natural (N) paper and coated, halftone paper (H) is printed with a 70 dots per cm² gravure roller having a well depth of 16, 24 and 36 μm and the reflectance of the prints is measured. The reflectance is compared with the reflectance at 580 nm (visible region) and 870 nm (IR region).

TABLE 2

| Ex. No. | Dye No. | Well depth [μm] | Paper | Reflectance [%] at 550 nm | Reflectance [%] at 870 nm |
|---|---|---|---|---|---|
| 56 | 8 | 16 | H | 73.5 | 68.0 |
| 57 | 8 | 16 | N | 69.6 | 66.6 |
| 58 | 8 | 24 | H | 68.7 | 45.0 |
| 59 | 8 | 24 | N | 65.6 | 43.5 |
| 60 | 8 | 36 | H | 59.3 | 19.7 |
| 61 | 8 | 36 | N | 57.6 | 22.7 |

The unprinted papers had the following reflectance values:

| | Reflectance [%] at 550 nm | Reflectance [%] at 870 nm |
|---|---|---|
| H | 76.9 | 90.8 |
| N | 71.8 | 89.0 |

We claim:

1. A method of printing a substrate, comprising printing said substrate by intaglio, letterpress or flexographic printing with a liquid printing ink comprising a solvent, binder and one or more dyes having an adsorption maximum of from 700 to 1200 nm, said dyes being:
    a. metal-free phthalocyanines,
    b. phthalocyanines complexed with two lithium atoms, or with magnesium, zinc, copper or nickel as central atoms,
    c. metal-free naphthalocyanines,
    d. naphthalocyanines complexed with two lithium atoms, or with magnesium, zinc, copper or nickel as central atoms,
    e. nickel-dithiolene complexes,
    f. aminimum compounds of aromatic amines, or
    g. methine dyes, or
    h. azulenesquaric acid dyes.

2. The method of printing according to claim 1, wherein said one or more dyes are present in the liquid printing ink in an amount of 0.001 to 15% by weight.

3. The method of printing according to claim 1, wherein said one or more dyes comprise metal-free phthalocyanines.

4. The method of printing according to claim 1, wherein said one or more dyes comprise phthalocyanines complexed with two lithium atoms, or with magnesium, zinc, copper or nickel as central atoms.

5. The method of printing according to claim 1, wherein said one or more dyes comprises metal-free naphthalocyanines.

6. The method of printing according to claim 1, wherein said one or more dyes comprise naphthalocyanines complexed with two lithium atoms, or with magnesium, zinc, copper or nickel as central atoms.

7. The method of printing according to claim 1, wherein said one or more dyes comprise nickel-dithiolene complexes.

8. The method of printing according to claim 1, wherein said one or more dyes comprise aminimum compounds of aromatic amines.

9. The method of printing according to claim 1, wherein said one or more dyes comprise methine dyes.

10. The method of printing according to claim 1, wherein said one or more dyes are azulenesquaric acid dyes.

* * * * *